United States Patent

Yamagiwa et al.

Patent Number: 5,818,139
Date of Patent: Oct. 6, 1998

[54] BRUSHLESS DC MOTOR

[75] Inventors: Akio Yamagiwa; Kazunobu Ooyama; Hiroaki Kojima, all of Kusatsu, Japan

[73] Assignee: Daikin Industries, Ltd., Osaka, Japan

[21] Appl. No.: 776,238

[22] PCT Filed: Jul. 25, 1995

[86] PCT No.: PCT/JP95/01489

§ 371 Date: Mar. 27, 1997

§ 102(e) Date: Mar. 27, 1997

[87] PCT Pub. No.: WO96/03793

PCT Pub. Date: Feb. 8, 1996

[30] Foreign Application Priority Data

Jul. 25, 1994 [JP] Japan ................................ 6-172909

[51] Int. Cl.$^6$ ............................................ H02K 1/27
[52] U.S. Cl. ........................ 310/156; 310/162; 310/261
[58] Field of Search .................................. 310/156, 161, 310/162, 261, 262, 168, 166

[56] References Cited

U.S. PATENT DOCUMENTS

| | | | |
|---|---|---|---|
| 3,492,520 | 1/1970 | Yates | 310/156 |
| 4,139,790 | 2/1979 | Steen | 310/156 |
| 4,358,696 | 11/1982 | Liu et al. | 310/156 |
| 5,548,172 | 8/1996 | Kliman et al. | 310/156 |

FOREIGN PATENT DOCUMENTS

| | | | |
|---|---|---|---|
| 3427677 | 2/1985 | Germany | H02K 21/46 |
| 4-69027 | 3/1992 | Japan | H02K 1/27 |
| 4-138042 | 5/1992 | Japan | H02K 1/27 |
| 4-98847 | 8/1992 | Japan | H02K 1/27 |
| 4-98848 | 8/1992 | Japan | H02K 1/27 |
| 5-236684 | 9/1993 | Japan | H02K 1/27 |
| 5-236685 | 9/1993 | Japan | H02K 1/27 |
| 5-236687 | 9/1993 | Japan | H02K 1/27 |

Primary Examiner—Steven L. Stephan
Assistant Examiner—B. Mullins
Attorney, Agent, or Firm—Beveridge, DeGrandi, Weilacher & Young, LLP

[57] ABSTRACT

Permanent magnet housing spaces 3b and spaces 3c for flux barrier are formed within a rotor 3. A minimum value of a distance from a portion on a boundary face of the permanent magnet housing space in a rotor surface side which portion corresponds to an edge section of a permanent magnet 4 in its width direction to boundary faces of the both spaces in a rotation shaft side of the rotor 3 is determined to be greater than a distance of the permanent magnet housing space 3b in the thickness direction at an edge section of the permanent magnet 4 in its width direction, so that initial performance is maintained by preventing demagnetization of the permanent magnet due to a negative magnetic field from occurring. Thus a decrease in the cost of a brushless DC motor is realized by decreasing the volume of the permanent magnet.

5 Claims, 10 Drawing Sheets

BRUSHLESS DC MOTOR

TECHNICAL FIELD

The present invention relates to a brushless DC motor. More particularly, the present invention relates to a brushless DC motor including a stator and a rotor, which rotor includes permanent magnets each having a plate shape and a predetermined thickness therein so that the permanent magnets are parallel to a rotation axis of the rotor, and which rotor includes spaces for flux barrier each of which space elongates from an edge section of a permanent magnet housing space in a direction which is vertical to the rotation axis to a rotor surface.

BACKGROUND ART

From past, investigation and development are advanced for applying a brushless DC motor to various fields in view of advantage of possibility of improving of efficiency due to lack of secondary copper losses. A brushless DC motor is classified into two groups. One group has an arrangement that permanent magnets are mounted on a rotor surface (hereinafter, referred to as a surface DC motor). The other group has an arrangement that permanent magnets are built in and maintained in an interior of the rotor (hereinafter, referred to as a built in DC motor).

The built in DC motor includes a rotor in an interior of a stator, which rotor includes permanent magnets each having a plate shape and a predetermined thickness therein so that the permanent magnets are parallel to a rotation axis of the rotor, and which rotor includes spaces for flux barrier each of which elongates from an edge section of a permanent magnet housing space in a direction which is vertical to the rotation axis to an rotor surface, as is illustrated in Japanese Patent Laied-Open Gazette No. Hei 5-236686, and "Interior Permanent-Magnet Synchronous Motors for Adjustable-Speed Drives", IEEE TRANSACTIONS ON INDUSTRY APPLICATIONS, VOL. IA-22, NO. 4, JULY/AUGUST 1986, for example. A built in DC motor has advantages in comparison to a surface DC motor that driving in a wider range is possible, a higher torque is generated, and driving with higher efficiency is possible due to higher torque.

Further, a built in DC motor has permanent magnets within a rotor at predetermined positions which are near a rotation axis of the rotor so that a volume of each permanent magnet is smaller in comparison to a surface DC motor, therefore rare earth element permanent magnets having larger energy products are employed as permanent magnets.

In a built in DC motor having the above arrangement, a plate shaped permanent magnet is housed in an entirety of each permanent magnet housing space which elongates in a direction which is parallel to a rotation axis. Therefore, a negative magnetic field converges at edge sections of the permanent magnet (each edge section faces a space for flux barrier) so that an operating point of the permanent magnet exceeds an inflection point and demagnetization of the permanent magnet occurs (refer to points A and B and an arrow of characteristic curves of a rare earth element permanent magnet illustrated in FIG. 12, for example), when a negative magnetic field is applied to the permanent magnet which is built in and maintained in an interior of a rotor such that when the built in DC motor is started, when an inverter is in trouble, when the built in DC motor is driven by magnetic flux weakening control and the like. Specifically, lines of magnetic force under a condition that a negative magnetic field is applied to a permanent magnet are lines of magnetic force illustrated in FIG. 13. When the permanent magnet is virtually divided into a 2×16 number of small regions and a magnetic flux density of each region is measured, the measured magnetic flux densities are magnetic flux densities illustrated in FIG. 14 and magnetic flux densities at both regions which are located at edges are extremely smaller than that of other regions. Actually, the both edge regions exceed the inflection point so that magnetic flux densities of the both edge regions are 0. Further, each numeral illustrated in FIG. 14 represents a magnetic flux density at a central point of each region.

When demagnetization of a permanent magnet occurs, the original performance of a built in DC motor cannot be maintained so that reliability of a built in DC motor is lowered.

To prevent these disadvantages from occurring, it can be thought that permanent magnets having greater thicknesses are employed for a conventional built in DC motor, the thickness being determined so that a negative magnetic field is not converged at edge sections of the permanent magnets and demagnetization does not occur. When this arrangement is realized, needed quantity of rare earth element permanent magnet having a higher cost is increased so that a cost of a rotor is raised and causes a cost of a built in DC motor to be raised.

Further, it can be thought that a flowing current is limited so that an operating point of a rare earth element permanent magnet does not exceed an inflection point, or that a temperature of a rare earth element permanent magnet is lowered. When such limitations are applied, an operating range becomes narrower, a sufficiently great torque cannot be generated, driving with sufficiently high efficiency cannot be performed. Consequently, advantages of a built in DC motor cannot be sufficiently realized.

The present invention was made in view of the above problems.

It is an object of the present invention to offer a brushless DC motor which prevents convergence of a negative magnetic field at edge sections of each permanent magnet from occurrence and prevents demagnetization of each permanent magnet from occurence without an increase in thickness of each permanent magnet so that sufficient performance of a brushless DC motor is realized.

DISCLOSURE OF THE INVENTION

A brushless DC motor according to claim 1 determines a permanent magnet housing space and a space for flux barrier so that a minimum value of a distance from a portion of a boundary face of the permanent magnet housing space in a rotor surface side which boundary face corresponds to an edge section in an width direction of the permanent magnet to a boundary face of the permanent magnet housing space and the space for flux barrier in a rotation axis side of the rotor, is greater than a distance of the permanent magnet housing space in its thickness direction at the edge section in the width direction of the permanent magnet.

When the brushless DC motor accoding to claim 1 is employed, the brushless DC motor includes a stator and a rotor, and the permanent magnet housing spaces are formed at predetermined positions which spaces are parallel to the rotation axis of the rotor, and each permanent magnet having a predetermined thickness and width is housed in a corresponding permanent magnet housing space, and each space for flux barrier is formed in the rotor which space elongates from corresponding edge section of the permanent magnet housing space in the width direction of the permanent magnet towards a rotor surface. In the brushless DC motor, the permanent magnet housing space and the space for flux barrier are determined so that the minimum value of the distance from the portion of the boundary face of the permanent magnet housing space in the rotor surface side which boundary face corresponds to the edge section in the width direction of the permanent magnet to the boundary face of the permanent magnet housing space and the space for flux barrier in the rotation axis side of the rotor, is greater than the distance of the permanent magnet housing space in its thickness direction at the edge section in the width direction of the permanent magnet. Therefore, a negative magnetic field never converges at edge sections of each permanent magnet so that a negative magnetic field is applied almost uniformly to an entirety of each permanent magnet, even when the negative magnetic field is applied to the permanent magnet. Consequently, demagnetization due to convergence of the negative magnetic field is prevented from occurrence without increase of thickness of the permanent magnet. Performance of a built in DC motor is sufficiently realized. An increase in cost of a built in DC motor due to enlarging the permanent magnets in their sizes is prevented from occurrence.

A brushless DC motor accoding to claim 2 determines a width and a housing position of each permanent magnet so that a minimum value of a distance from a portion of a boundary face of the permanent magnet housing space in a rotor surface side which boundary face corresponds to an edge section in an width direction of the permanent magnet to a boundary face of the permanent magnet housing space and the space for flux barrier in a rotation axis side of the rotor, is greater than a distance of the permanent magnet housing space in its thickness direction at the edge section in the width direction of the permanent magnet.

When the brushless DC motor accoding to claim 2 is employed, the brushless DC motor includes a stator and a rotor, and the permanent magnet housing spaces are formed at predetermined positions which spaces are parallel to the rotation axis of the rotor, and each permanent magnet having a predetermined thickness and width is housed in a corresponding permanent magnet housing space, and each space for flux barrier is formed in the rotor which space elongates from corresponding edge section of the permanent magnet housing space in the width direction of the permanent magnet towards an rotor surface. In the brushless DC motor, the width and the housing position of each permanent magnet are determined so that the minimum value of the distance from the portion of the boundary face of the permanent magnet housing space in a rotor surface side which boundary face corresponds to the edge section in an width direction of the permanent magnet to the boundary face of the permanent magnet housing space and the space for flux barrier in the rotation axis side of the rotor, is greater than the distance of the permanent magnet housing space in its thickness direction at the edge section in the width direction of the permanent magnet. Therefore, a negative magnetic field never converges at edge sections of each permanent magnet so that a negative magnetic field is applied almost uniformly to an entirety of each permanent magnet, even when the negative magnetic field is applied to the permanent magnet. Consequently, demagnetization due to convergence of the negative magnetic field is prevented from occurrence without increase of thickness of the permanent magnet. Performance of a built in DC motor is sufficiently realized. An increase in cost of a built in DC motor due to enlarging the permanent magnets in their sizes is prevented from occurrence.

A brushless DC motor accoding to claim 3 determines a formula of $1r \geq 1m(1+\cos \theta 2)/\sin \theta 2-(1w^2-1m^2)^{1/2}$ in correspondence to formulae of $1w<1m/\sin (\theta 2/2)$ and $1r \leq 1r'$, and determines a formula of $1r \geq 1m(1+\cos \theta 2/\sin \theta 2) 2+(1w^2-1m^2)^{1/2}$ in correspondence to formulae of $1w<1m/\sin (\theta 2/2)$ and $1r>1r'$, when an angle between boundary faces in a rotation axis side of a permanent magnet housing space and a space for preventing short circuit of magnetic flux from occurence is determined to be 2, a length of the permanent magnet housing space in its thickness direction is determined to be 1m, a distance between a connection section of boundary faces of the permanent magnet housing space and the space for flux barrier in a rotor surface side and a connection section of boundary faces of the permanent magnet housing space and the space for flux barrier in an rotation axis side is determined to be 1w, a distance from a connection section of the boundary face of the permanent magnet housing space in a rotor surface side and corresponding boundary face of the space for flux barrier to an edge section of the permanent magnet in its width direction is determined to be 1r, and a distance from a connection section of the boundary face of the permanent magnet housing space in an rotation axis side and corresponding boundary face of the space for flux barrier to an corresponding edge section of the permanent magnet in its width direction is determined to be 1r'.

When the brushless DC motor according to claim 3 is employed, functions which are similar to those of claim 2 are performed because the formula of $1r \geq 1m(1+\cos \theta 2)/\sin \theta 2-(1w^2-1m^2)^{1/2}$ in correspondence to formulae of $1w<1m/\sin (\theta 2/2)$ and $1r \leq 1r'$, and determines the formula of $1r \geq 1m(1+\cos \theta 2)/\sin \theta 2+(1w^2-1m^2)^{1/2}$ in correspondence to formulae of $1w<1m/\sin (\theta 2/2)$ and $1r>1r'$, when the angle between boundary faces in rotation axis side of the permanent magnet housing space and the space for preventing short circuit of magnetic flux from occurence is determined to be 2, the length of the permanent magnet housing space in its thickness direction is determined to be 1m, the distance between the connection section of boundary faces of the permanent magnet housing space and the space for flux barrier in a rotor surface side and the connection section of boundary faces of the permanent magnet housing space and the space for flux barrier in an rotation axis side is determined to be 1w, the distance from the connection section of the boundary face of the permanent magnet housing space in a rotor surface side and corresponding boundary face of the space for flux barrier to the edge section of the permanent magnet in its width direction is determined to be 1r, and the distance from the connection section of the boundary face of the permanent magnet housing space in an rotation axis side and corresponding boundary face of the space for flux barrier to the corresponding edge section of the permanent magnet in its width direction is determined to be 1r'.

A brushless DC motor according to claim 4 further includes projection sections for preventing movement of a permanent magnet in its width direction which projection sections are formed at a boundary face of a permanent magnet housing space.

The brushless DC motor according to claim 4 prevents a disadvantage from occurrence that the permanent magnet moves to a position at which a negative magnetic field may converge so that functions which are similar to those of one of claims 1 through 3 are performed, because the brushless DC motor further includes projection sections for preventing movement of the permanent magnet in its width direction which projection sections are formed at the boundary face of the permanent magnet housing space.

A brushless DC motor according to claim 5 determines a space for flux barrier to be formed from an edge section of a permanent magnet housing section towards a rotor surface in a linear manner, and determines a width of a permanent magnet to be smaller than a width of a permanent magnet housing space.

When the brushless DC motor according to claim 5 is employed, the brushless DC motor includes a stator and a rotor, and the permanent magnet housing spaces are formed at predetermined positions which spaces are parallel to the rotation axis of the rotor, and each permanent magnet having a predetermined thickness and width is housed in a corresponding permanent magnet housing space, and each space for flux barrier is formed in the rotor which space elongates from a corresponding edge section of the permanent magnet housing space in the width direction of the permanent magnet towards a rotor surface. In the brushless DC motor, the space for flux barrier to be formed from the edge section of the permanent magnet housing section towards the rotor surface in a linear manner, determines the width of the permanent magnet to be smaller than the width of the permanent magnet housing space. Therefore, a negative magnetic field never converges at edge sections of each permanent magnet so that a negative magnetic field is applied almost uniformly to an entirety of each permanent magnet, even when the negative magnetic field is applied to the permanent magnet. Consequently, demagnetization due to convergence of the negative magnetic field is prevented from occurrence without increase of thickness of the permanent magnet. Performance of a built in DC motor is sufficiently realized. An increase in cost of a built in DC motor due to enlarging the permanent magnets in their sizes is prevented from occurrence.

A brushless DC motor according to claim 6 determines a thickness of a space for flux barrier to be equal or smaller than a distance of a permanent magnet housing space in a thickness direction of a permanent magnet which distance is a distance at an edge section of the permanent magnet housing space in a width direction of the permanent magnet.

When the brushless DC motor according to claim 6 is employed, the permanent magnet is positioned at a position of a rotor following a decrease in size of the space for flux barrier which position is a more close position to a rotation axis of the rotor so that an iron section in an outer surface side of the permanent magnet and a magnetic flux flows more easily, therefore a reluctance torque is effectively utilized, in addition to the function of claim 5, because the brushless DC motor determines the thickness of the space for flux barrier to be equal or smaller than the distance of the permanent magnet housing space in a thickness direction of the permanent magnet which distance is a distance at the edge section of the permanent magnet housing space in a width direction of the permanent magnet.

A brushless DC motor according to claim 7 forms a permanent magnet housing space and a space for flux barrier so that a minimum value of a distance from a portion of a bundary face of the permanent magnet housing space in a rotor surface side which portion corresponds to an edge section of a permanent magnet in its width direction to boundary faces of the both spaces in a rotation axis side of the rotor, is greater than a distance of the permanent magnet housing space in its thickness direction at the edge section of the permanent magnet in its width direction, and determines a formula of $1m \geq 1m'$ when the distance of the permanent magnet housing space in its thickness direction is determined to be 1m, and a distance of the space for flux barrier in a circumferential direction.

When the brushless DC motor according to claim 7 is employed, a negative magnetic field never converge at edge sections of each permanent magnet so that the negative magnetic field is almost uniformly applied to the permanent magnet in its entirety even when the negative magnetic field is applied to the permanent magnet, because the brushless DC motor forms the permanent magnet housing space and the space for flux barrier flux is so that the minimum value of the distance from the portion of the bundary face of the permanent magnet housing space in the rotor surface side which portion corresponds to the edge section of the permanent magnet in its width direction to boundary faces of the both spaces in a rotation axis side of the rotor, is greater than the distance of the permanent magnet housing space in its thickness direction at the edge section of the permanent magnet in its width direction, and determines the formula of $1m \geq 1b$ when the distance of the permanent magnet housing space in its thickness direction is determined to be 1m, and the distance of the space for flux barrier in a circumferential direction is determined to be 1b. Consequently, demagnetization due to convergence of the negative magnetic field is prevented from occurrence without increase of thickness of the permanent magnet. Performance of a built in DC motor is sufficiently realized. An increase in cost of a built in DC motor due to enlarging the permanent magnets in their sizes is prevented from occurrence. Further, a magnetic resistance of the space for flux barrier is smaller when magnetic resistances of the permanent magnet section and the space for flux barrier are compared to one another, therefore a magnetic flux from a stator easily passes through the space for flux barrier within a negative magnetic field (during demagnetizing operation) so that demagnetizing operation to the permanent magnet is reduced. Furthermore, the permanent magnet is positioned in a position which is a more close position to the rotation axis of the rotor following a decrease in size of the space for flux barrier so that an iron section in an outer surface side of the permanent magnet and a magnetic flux flows more easily, therefore a reluctance torque is effectively utilized.

BEST MODES FOR UTILIZING THE PRESENT INVENTION

Hereinafter, referring to the attached drawings, we explain the present invention in detail.

Figure 1:
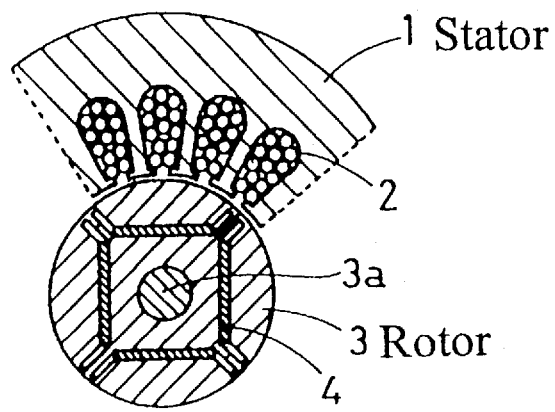
FIG. 1 is a cross sectional view schematically illustrating a brushless DC motor of an embodiment according to the present invention.
Figure 2:
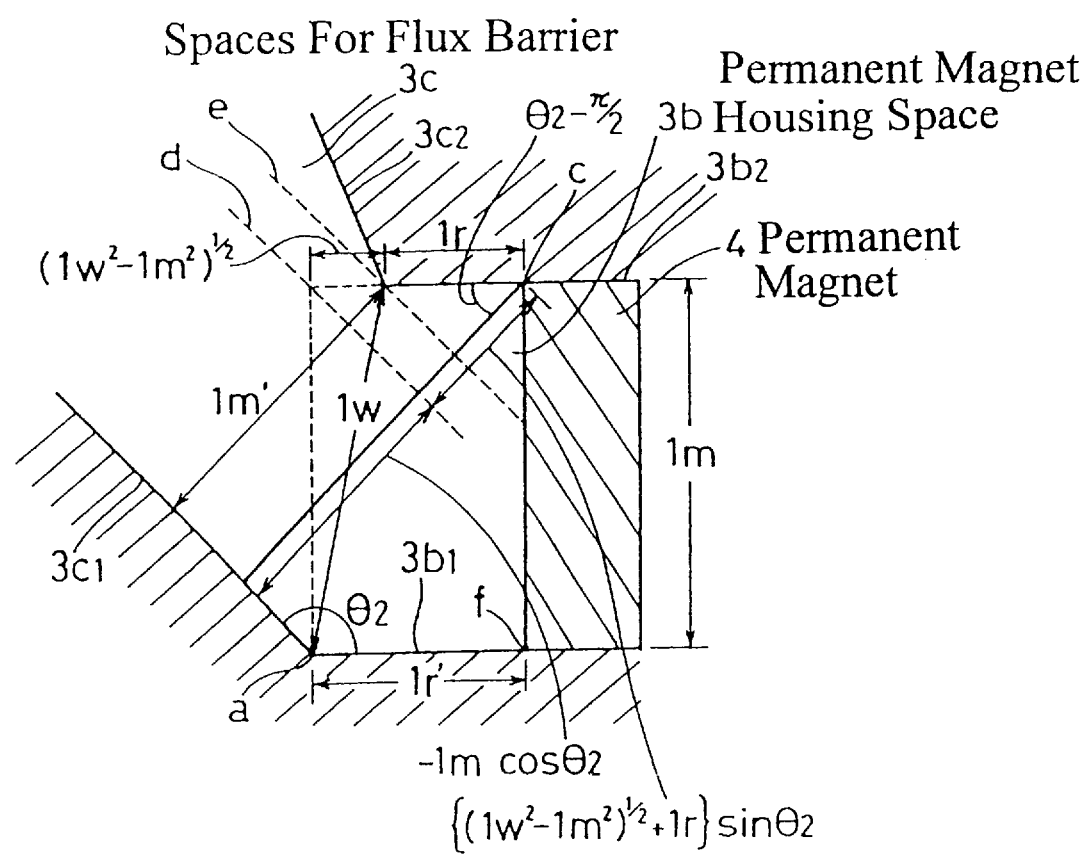
FIG. 2 is an enlarged diagram of a main portion in FIG. 1.

FIG. 1 is a cross sectional view schematically illustrating a brushless DC motor of an embodiment according to the present invention, while FIG. 2 is an enlarged diagram of a main portion in FIG. 1.

The brushless DC motor includes a stator 1 having stator windings 2 and a rotor 3 having permanent magnets 4. The rotor 3 is made by laminating a plurality of electromagnetic steel plates and the rotor has a rotation shaft (rotation axis) 3a which passes through their center in the shaft direction. Further, the rotor 3 includes permanent magnet housing spaces 3b each having a predetermined width and a predetermined thickness of 1m and spaces 3c for flux barrier. Each permanent magnet housing space 3b crosses at a right angle to a radius at a rotation symmetry position by 90 degrees, and elongates in the direction of the rotation shaft, and is positioned at a predetermined position which is a close position to the rotation shaft, because the brushless DC motor of this embodiment has a four pole arrangement. Each space 3c for flux barrier elongates from an edge section of corresponding permanent magnet housing space 3b towards a rotor surface 3. A permanent magnet 4 made of a rare earth element magnet and the like is housed in each permanent magnet housing space 3b. Further, a first cross line of a boundary face 3b1 of the permanent magnet housing space 3b in the rotation shaft side and a corresponding boundary face 3c1 of the space 3c for flux barrier is represented with a, a second cross line of a boundary face 3b2 of the permanent magnet housing space 3b in a rotor surface side and a corresponding boundary face 3c2 of the space 3c for flux barrier is represented with b, an angle between the boundary face 3b1 of the permanent magnet housing space 3b in the rotation shaft side and the corresponding boundary face 3c1 of the space 3c for flux barrier is represented with θ2, and an edge section of the permanent magnet 4 on a face which is in the rotor surface side and in a direction which crosses at a right angle to a radial direction of the rotor 3 is represented with c. Furthermore, a distance 1m' between the second cross line b and the boundary face 3c1 of the space 3c for flux barrier which boundary face 3c1 corresponds to the boundary face 3b1 of the permanent magnet housing space 3b in the rotation shaft side, is determined to be shorter than a distance 1m between the boundary faces 3b1 and 3b2 of the permanent magnet housing space 3b. A distance 1r between the edge section c of the permanent magnet 4 and the second cross line b is determined to be shorter than a distance 1r' between an edge section f on a face of the permanent magnet 4 which face is a rotation shaft side and in a direction which crosses at a right angle to the radial direction of the rotor 3 and the first cross line a. That is, the first cross line a is positioned at an outer side with respect to the second cross line b.

Referring to FIG. 2, description is made in more detail. Further, a first and second dashed lines d and e and the solid line 3c1 which are applied "//" in FIG. 2 are parallel to one another. Futhermore, the second dashed line e is a dashed line which represents a plane which passes through the second cross line b, the first dashed line d is a dashed line which represents a plane which passes through a straight line opposite to the first cross line a on an elongated portion of the rotation shaft-ward boundary face 3b1 of the permanent magnet housing space 3b.

In this embodiment, the thickness 1m' of the space 3c for flux barrier is determined to be smaller than the thickness 1m of the permanent magnet housing space 3b and the first cross line a is positioned outward with respect to the second cross line b, therefore a distance between the both dashed lines d and e in an elongate direction of the boundary face 3b1 of the permanent magnet housing space 3b in an rotation shaft side of the rotor 3 is $(1w^2-1m^2)^{1/2}$, a distance between the first dashed line d and the boundary face 3c1 of the space 3c for flux barrier is $-1m \cos \theta 2$, and a distance between the first dashed line d and the edge section c of the permanent magnet 4 is $\{(1w^2-1m^2)^{1/2}+1r\} \sin \theta 2$. Consequently, a distance between the boundary face 3c1 of the space 3c for flux barrier and the edge section c of the permanent magnet 4 is $-1m \cos \theta 2 + \{(1w^2+1m^2)^{1/2}+1r\} \sin \theta 2$. When the distance is greater than 1m, a reverse magnetic field never converges at edge sections of the permanent magnet 4, therefore a formula of $1r \geq 1m(1+\cos \theta 2)/\sin \theta 2 - (1w^2+1m^2)^{1/2}$ is obtained by putting the relationship in order.

Consequently, when the edge section c of the permanent magnet 4 is apart from the second cross line b so that the distance 1r satisfies the above formula, a negative magnetic field never converges the edge sections of the permanent magnet 4 and the negative magnetic field is applied uniformly to the permanent magnet 4 in its entirety. As a result, demagnetization due to convergence of the negative magnetic field is prevented from occurrence without increase of thickness of the permanent magnet 4. Performance of a built in DC motor is sufficiently realized. An increase in cost of a built in DC motor due to enlarging the permanent magnets in their sizes is prevented from occurrence.

Second Embodiment

Figure 3:
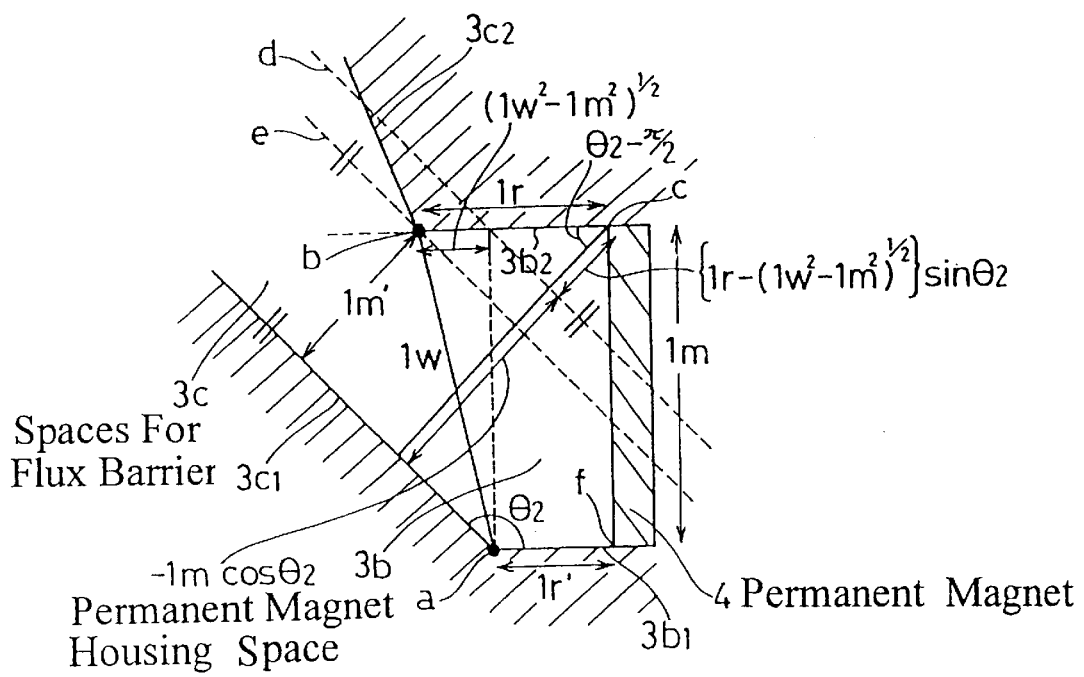
FIG. 3 is a schematic diagram illustrating a main portion of a brushless DC motor of another embodiment according to the present invention.

FIG. 3 is a schematic diagram illustrating a main portion of a brushless DC motor of another embodiment according to the present invention.

This embodiment differs from the above embodiment in that the first cross line a is positioned at an inner position with respect to the second cross line b.

When this embodiment is employed, a distance between the both dashed lines d and e in an elongate direction of the boundary face 3b1 of the permanent magnet housing space 3b in an rotation shaft side of the rotor 3 is $(1w^2-1m^2)^{1/2}$, a distance between the first dashed line d and the boundary face 3c1 of the space 3c for flux barrier is $-1m \cos 2$, and a distance between the first dashed line d and the edge section c of the permanent magnet 4 is $\{1r-(1w^2-1m^2)^{1/2}\} \sin \theta 2$. Consequently, a distance between the boundary face 3c1 of the space 3c for flux barrier and the edge section c of the permanent magnet 4 is $-1m \cos \theta 2 + \{1r-(1w^2-1m^2)^{1/2}\} \sin \theta 2$. When the distance is greater than 1m, a negative magnetic field never converges at edge sections of the permanent magnet 4, therefore a formula of $1r \geq 1m(1+\cos \theta 2)/\sin \theta 2 + (1w^2-1m^2)^{1/2}$ is obtained by putting the relationship in order.

Consequently, when the edge section c of the permanent magnet 4 is apart from the second cross line b so that the distance 1r satisfies the above formula, a negative magnetic field never converges the edge sections of the permanent magnet 4 and the negative magnetic field is applied uniformly to the permanent magnet 4 in its entirety. As a result, demagnetization due to convergence of the negative magnetic field is prevented from occurrence without increase of thickness of the permanent magnet 4. Performance of a built in DC motor is sufficiently realized. An increase in cost of a built in DC motor due to enlarging the permanent magnets in their sizes is prevented from occurrence.

Figure 4:
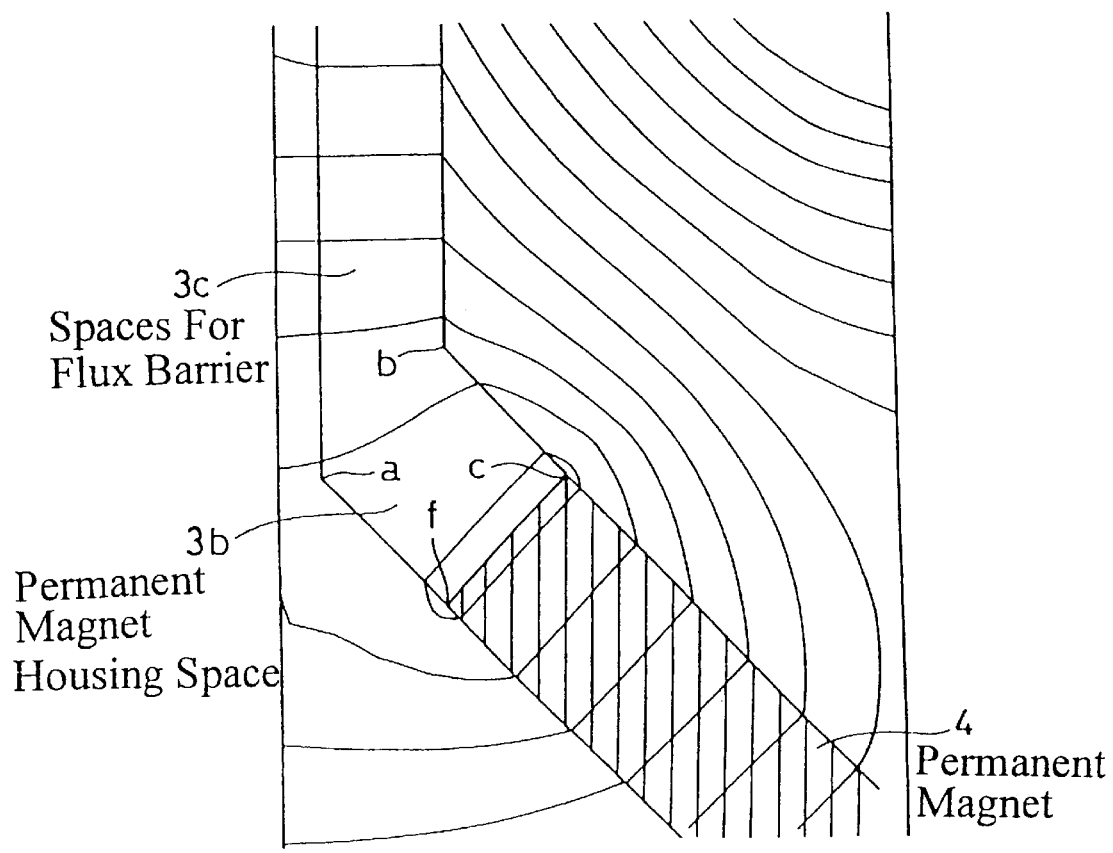
FIG. 4 is a diagram illustrating lines of magnetic flux within a rotor when the embodiment illustrated in FIG. 3 is employed.
Figure 5:
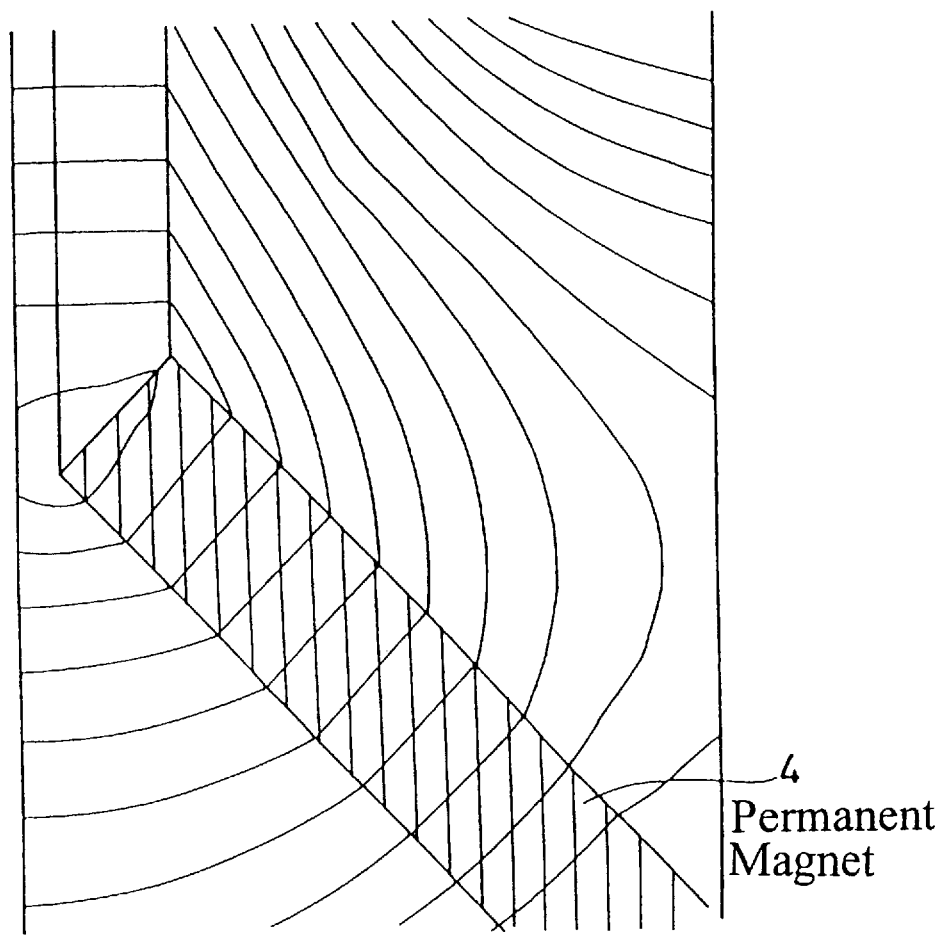
FIG. 5 is a diagram illustrating lines of magnetic flux within a conventional rotors

FIG. 4 is a diagram illustrating lines of magnetic flux within a rotor when the embodiment illustrated in FIG. 3 is employed, while FIG. 5 is a diagram illustrating lines of magnetic flux within a conventional rotor.

In FIG. 5, a magnetic flux of a permanent magnet is suppressed in edge sections of the permanent magnet due to influence of a negative magnetic field, but in FIG. 4, a magnetic flux goes out from a permanent magnet to a core of a rotor for the entire extent of the permanent magnet. Therefore, it is understood that local convergence of a negative magnetic field is prevented from occurrence.

Further, the thickness 1m' of the space 3c for flux barrier is determined to be equal to or smaller than the thickness 1m of the permanent magnet housing space 3b, that is the thickness of the permanent magnet 4, in the case illustrated in FIG. 4, therefore permanent magnets 4 are possibly positioned at close positions to the rotation shaft 3a of the rotor 3, and iron sections (steel core) located in an outer side with respect to outer faces of the permanent magnets 4 are increased in their volumes. In this case, a magnetic flux flows more easily due to the increase of the iron sections located in an outer side with respect to outer faces of the permanent magnets 4, therefore a reluctance torque is utilized more effectively. Further, a magnetic resistance of the space 3c for flux barrier is smaller than a magnetic resistance of the permanent magnet 4, therefore a magnetic flux from the stator 1 passes through the space 3c for flux barrier more easily within a negative magnetic field (when a demagnetizing operation is performed) so that a demagnetizing operation to the permanent magnet 4 is weakened.

Third Embodiment

Figure 6:
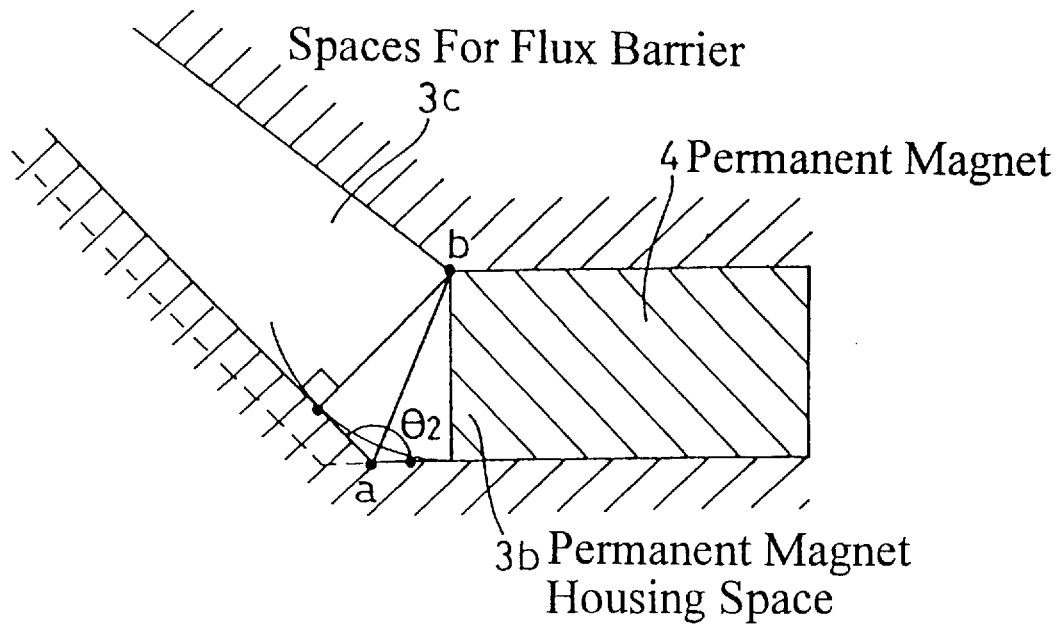
FIG. 6 is a schematic diagram illustrating a main portion in an enlarged condition of a brushless DC motor of a further embodiment according to the present invention.

FIG. 6 is a schematic diagram illustrating a main portion in an enlarged condition of a brushless DC motor of a further embodiment according to the present invention.

This embodiment differs from the embodiment illustrated in FIG. 2 in that a minimum value of a distance between the second cross line b and a point on a boundary face of the space 3c for flux barrier which boundary face corresponds to a boundary face of the permanent magnet housing space 3b in a rotation shaft side of the rotor, is determined to be equal to or greater than a distance of the permanent magnet housing space 3b in a radial direction of the rotor. Further, in FIG. 6, a solid line represents a case in which the minimum value is equal to the distance of the permanent magnet housing space 3b in a radial direction of the rotor, while a dashed line represents a case in which the minimum value is greater than the distance of the permanent magnet housing space 3b in a radial direction of the rotor.

In this embodiment, when the edge section c is apart from the second cross line b so that a formula of $1r \geq 0$ is satisfied (when $1r=0$, the edge section c is coincident to the second cross line b), a negative magnetic field never converges the edge sections of the permanent magnet 4 and the negative magnetic field is applied uniformly to the permanent magnet 4 in its entirety. As a result, demagnetization due to convergence of the negative magnetic field is prevented from occurrence without increase of thickness of the permanent magnet 4. Performance of a built in DC motor is sufficiently realized. An increase in cost of a built in DC motor due to enlarging the permanent magnets in their sizes is prevented from occurrence.

Figure 7:
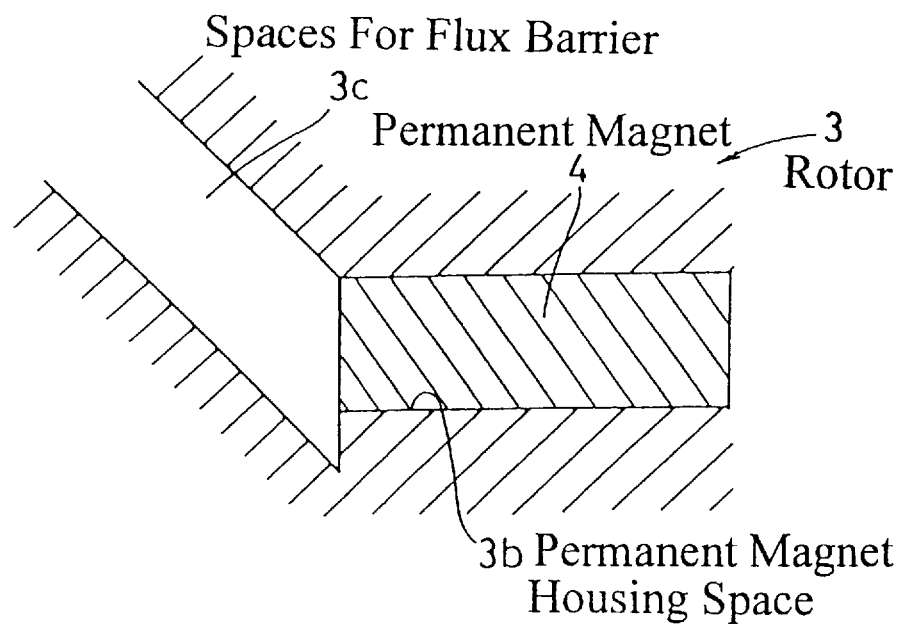
FIG. 7 is a schematic diagram illustrating a main portion in an enlarged condition of a brushless DC motor of a further embodiment according to the present invention.

Further, in any one of the above embodiments, description was made for a case in which the first cross line a actually exists. When the above boundary face of the permanent magnet housing space 3b and the above boundary face of the space 3c for flux barrier are smoothly connected in an arc shape, an operation which is similar to the operation of any one of the above embodiments is performed by supposing a virtual cross line of the both boundary faces and by applying any one of the above embodiments. Furthermore, it is possible that a minimum value of a distance from a portion on a boundary face of the permanent magnet housing space in a rotor surface to a boundary face of the space for flux barrier in a rotation shaft side of the rotor, is determined to be greater than a thickness of the permanent magnet housing space 3b, and a step section is formed at a connection section of the both spaces, as is illustrated in FIG. 7.

Fourth Embodiment

Figure 8:
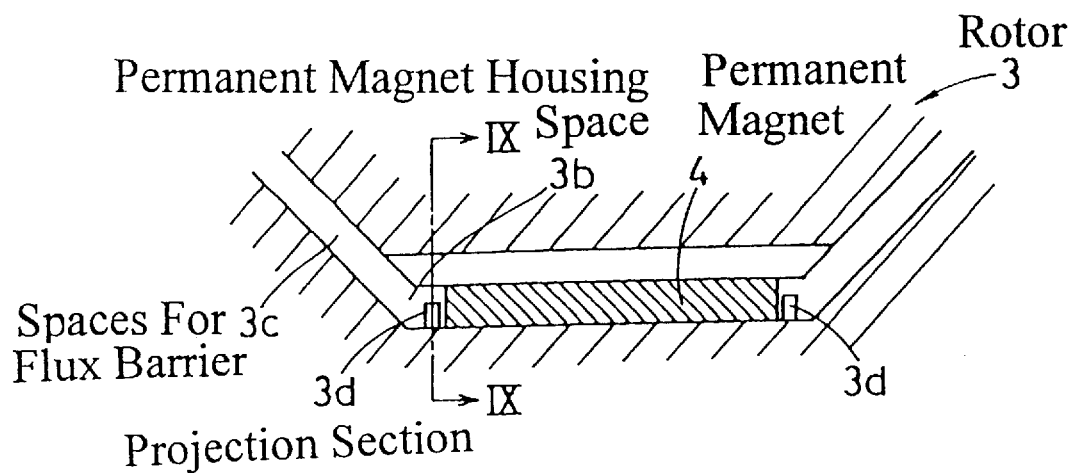
FIG. 8 is a schematic diagram illustrating a main portion in an enlarged condition of a brushless DC motor of a further embodiment according to the present invention.
Figure 9:
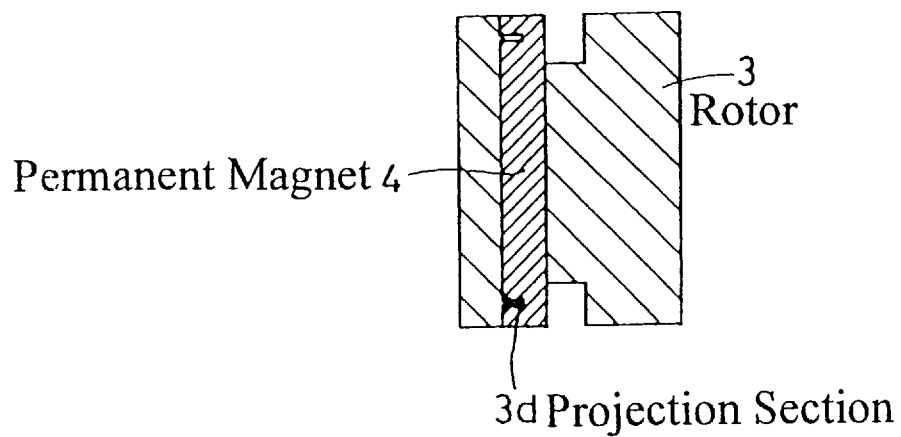
FIG. 9 is a cross sectional view taken along a line IX—IX in FIG. 8.

FIG. 8 is a schematic diagram illustrating a main portion in an enlarged condition of a brushless DC motor of a further embodiment according to the present invention, while FIG. 9 is a cross sectional view taken along a line IX—IX in FIG. 8.

Figure 10:
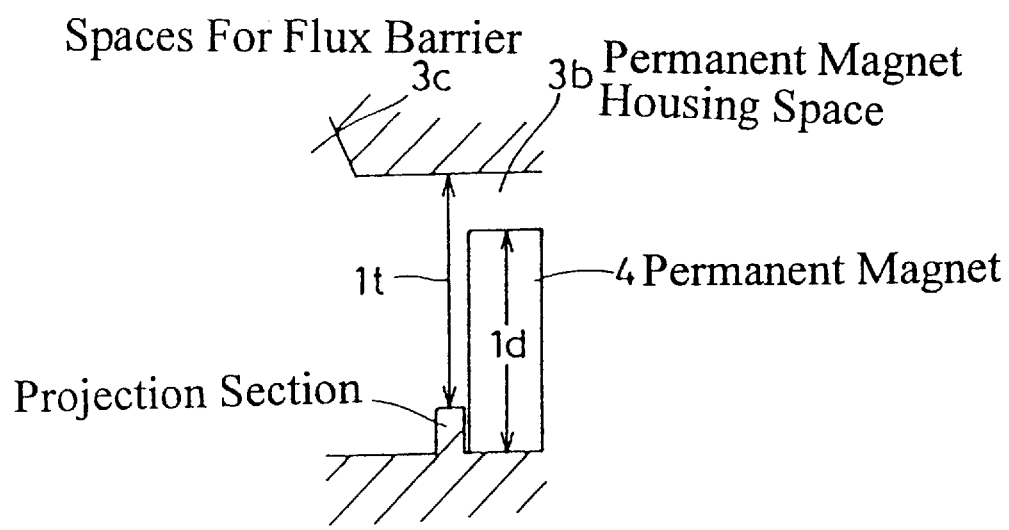
FIG. 10 is a diagram illustrating a projection portion in an enlarged condition.

This embodiment differs from the above embodiment in that projection sections 3d for regulating a position of the permanent magnet 4 in its width direction are provided at predetermined positions of the rotor 3 so that the distances 1r at both edge sections of the permanent magnet 4 are securely maintained, which projection sections 3d are positioned at predetermined positions in an interor of the permanent magnet housing space 3b. Each projection section 3d may be formed in an entire extent of the rotor 3 in a direction which is parallel to the rotation axis. Each projection section 3d also may be provided at at least two positions which are different from one another and each projection section 3d may be formed in one body with one or more electromagnetic steel plates. Further, the thickness 1m of the permanent magnet housing space 3b is locally decreased at a portion corresponding to the projection section 3d. Therefore, the thickness of the permanent magnet is determined to be greater so that a thickness 1t which is a locally decreased thickness is equal or greater than the thickness 1d of the permanent magnet 4, as is illustrated in FIG. 10, and convergence of a negative magnetic field to the edge sections of the permanent magnet 4 is prevented from occurrence. Further, an extent for determining the thickness of the permanent magnet housing space 3b to be greater, is determined to be a predetermined extent (a predetermined extent for preventing convergence of a negative magnetic field from occurrence) in a direction which is parallel to the rotation shaft with respect to the position at which the projection section 3d is provided, when the projection sections 3d are locally provided.

Therefore, the distances 1r are securely maintained at both edge sections of the permanent magnet 4, and an operation which is similar to the operation of the above embodiment is performed, when this embodiment is employed.

Fifth Embodiment

Figure 11A:
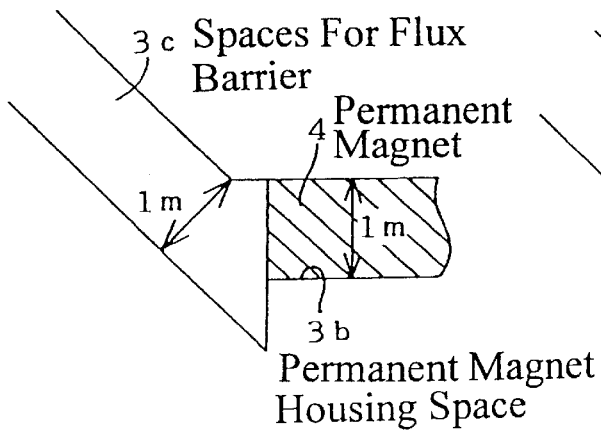
FIGS. 11(A) through 11(D) are schematic diagrams illustrating a main portion of brushless DC motors of further embodiments according to the present invention.

FIGS. 11(A) throgh 11(D) are schematic diagrams illustrating a main portion of brushless DC motors of further embodiments according to the present invention.

In these embodiments, a step section is provided at a connection section of the space 3c for flux barrier to the permanent magnet housing section 3b so that the thickness 1m' of the space 3c for flux barrier is greater than the thickness 1m of the permanent magnet housing space 3b. Further, the step section is formed toward the rotation shaft 3a of the rotor 3.

Figure 11B:
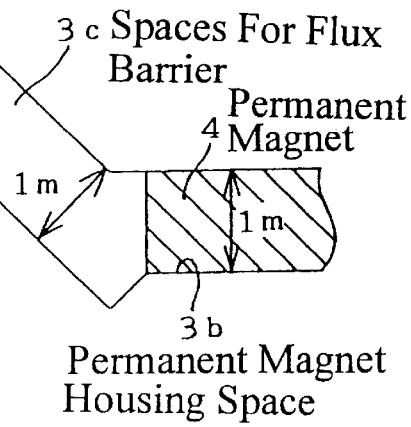

Further, in FIGS. 11(A) and 11(B), the thickness 1m' of the space 3c for flux barrier is determined to be smaller than the thickness 1m of the permanent magnet housing space (the thickness of the permanent magnet 4), and the edge section of the permanent magnet 4 is apart to a center side of the permanent magnet housing space 3b by a predetermined distance with respect to a connection section of a face of the permanent magnet housing space 3b in a rotor surface side to a corresponding face of the space 3c for flux barrier (the width of the permanent magnet is determined to be smaller than the width of the permanent magnet housing space 3b).

When the embodiments illustrated in FIGS. 11(A) and 11(B) are employed, the permanent magnets 4 are possibly disposed at close positions to the rotation shaft 3a of the rotor 3 so that iron sections (steel cores) which are positioned at the outer side with respect to permanent magnets 4 are increased, because the thickness 1m' of the space 3c for flux barrier is determined to be greater than the thickness 1m of the permanent magnet housing space 3b, that is the thickness of the permanent magnet 4. In this case, a magnetic flux flows more easily due to the increase of the iron sections located in an outer side with respect to outer faces of the permanent magnets 4, therefore a reluctance torque is utilized more effectively. Further, a magnetic resistance of the space 3c for flux barrier is smaller than a magnetic resistance of the permanent magnet 4, therefore a magnetic flux from the stator 1 passes through the space 3c for flux barrier more easily within a negative magnetic field (when a demagnetizing operation is performed) so that demagnetizing operation to the permanent magnet 4 is weakened.

Figure 11C:
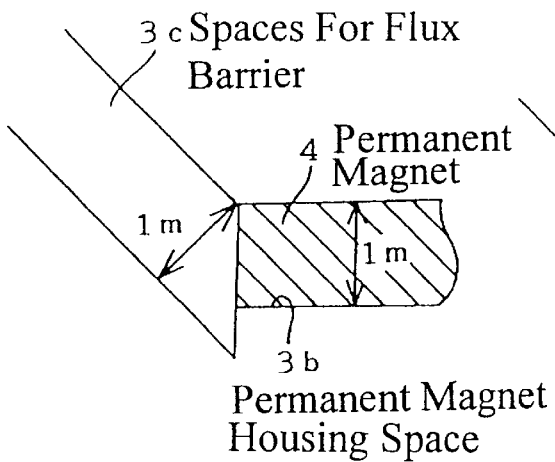
Figure 11D:
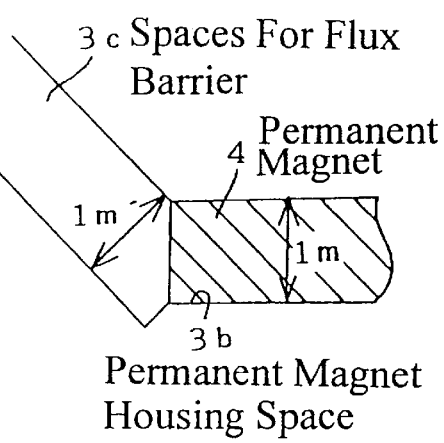
Figure 12:
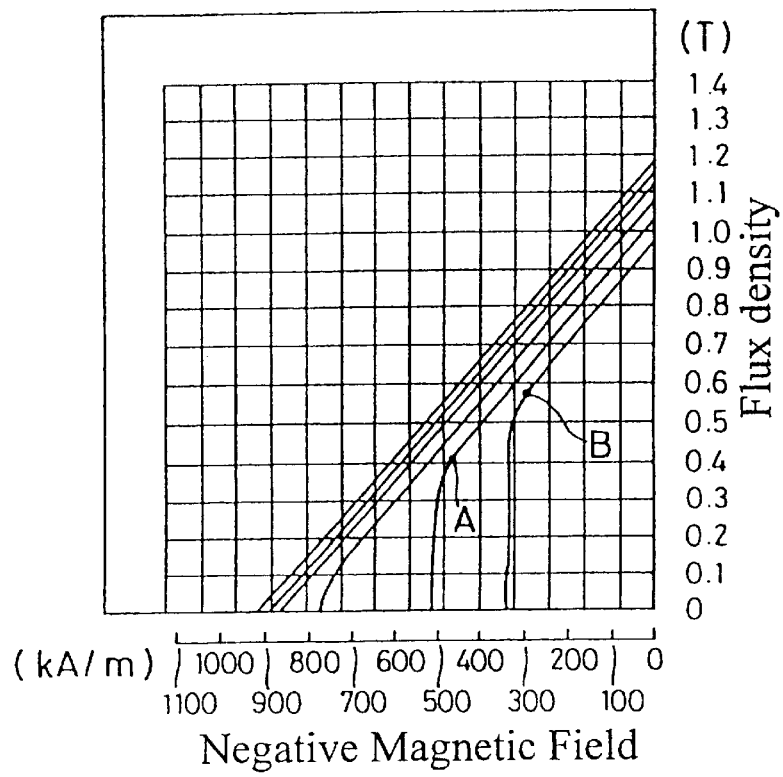
FIG. 12 is a diagram illustrating characteristic curves of a rare earth element permanent magnet.
Figure 13:
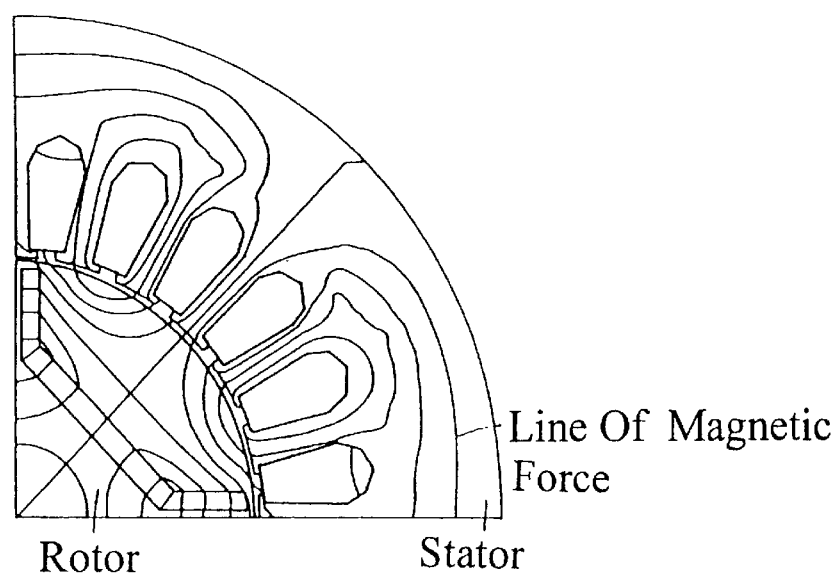
FIG. 13 is a diagram illustrating lines of magnetic force under a condition that a negative magnetic field is applied to a permanent magnet.
Figure 14:
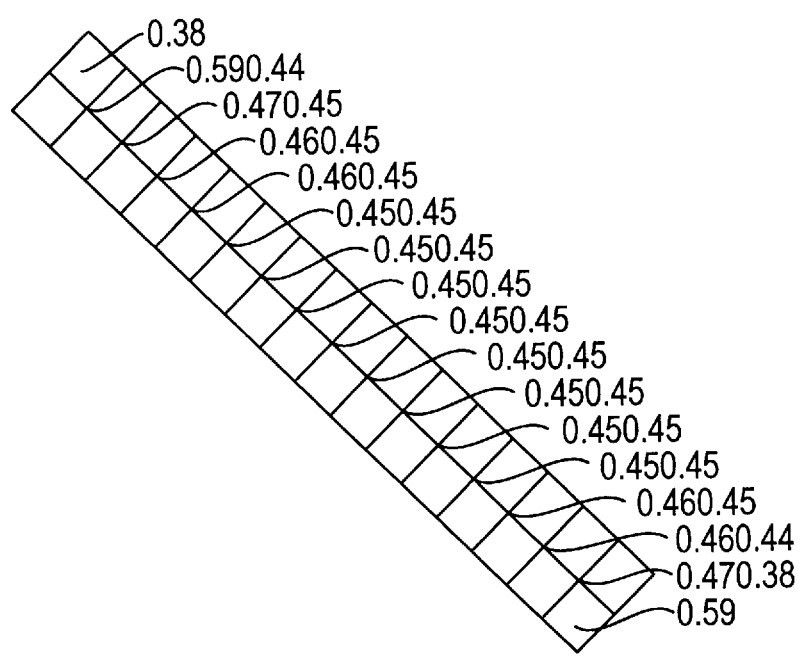
FIG. 14 is a diagram illustrating a measurement result of a magnetic flux density of each region when a permanent magnet is virtually divided into 2×16 small regions.

Further, in FIGS. 11(C) and 11(D), the thickness 1m' of the space 3c for flux barrier is determined to be equal to the thickness 1m of the permanent magnet housing space (the thickness of the permanent magnet 4), and the permanent magnet 4 is housed within the permanent magnet housing space 3b so that the edge section of the permanent magnet 4 is coincident to a connection section of a face of the permanent magnet housing space 3b in a rotor surface side to a corresponding face of the space 3c for flux barrier (the width of the permanent magnet is determined to be equal to the width of the permanent magnet housing space 3b).

When the embodiments illustrated in FIGS. 11(C) and 11(D) are employed, the permanent magnets 4 are possibly disposed at close positions to the rotation shaft 3a of the rotor 3 {slightly apart positions with respect to the positions of FIGS. 11(A) and 11(B)} so that iron sections (steel cores) which are positioned at the outer side with respect to permanent magnets 4 are increased {quantities of increase of iron sections are slightly smaller than quantities of increase of iron sections of FIGS. 11(A) and 11(B)}, because the thickness 1m' of the space 3c for flux barrier is determined to be equal to the thickness 1m of the permanent magnet housing space 3b, that is the thickness of the permanent magnet 4. In this case, a magnetic flux flows more easily due to the increase of the iron sections located in an outer side with respect to outer faces of the permanent magnets 4, therefore a reluctance torque is utilized more effectively. Further, magnetic resistances of the permanent magnet 4 and the space 3c for flux barrier are the same to one another, therefore the permanent magnet 4 can be housed within the permanent magnet housing space 3b in its entirety.

POSSIBILITY OF INDUSTRIAL UTILIZATION

Stable performance is achieved by suppressing demagnetization of permanent magnets and reluctance torque is effectively utilized when a brushless DC motor in which permanent magnets are provided at inner positions with respect to a surface of a rotor.

What is claimed is:

1. A brushless DC motor comprising a stator and a rotor, wherein permanent magnet housing spaces are formed at predetermined positions which housing spaces are parallel to a rotation shaft of the rotor, and permanent magnets having a predetermined thickness and width are housed in corresponding permanent magnet housing spaces, and wherein spaces for flux barrier are formed in the rotor, each of the spaces for flux barrier elongating from a corresponding edge section of a permanent magnet housing space in a width direction of a permanent magnet towards a rotor surface, and wherein a permanent magnet housing space and a space for flux barrier are determined so that the minimum value of the distance from the portion of the boundary face of the permanent magnet housing space in the rotor surface side, which boundary face corresponds to the edge section in the width direction of the permanent magnet, to the boundary face of the permanent magnet housing space and the space for flux barrier in the rotation axis side of the rotor, is greater than the distance of the permanent magnet housing space in its thickness direction at the edge section in the width direction of the permanent magnet.

2. A brushless DC motor comprising a stator and a rotor, wherein permanent magnet housing spaces are formed at predetermined positions which housing spaces are parallel to a rotation shaft of the rotor, and permanent magnets having a predetermined thickness and width are housed in corresponding permanent magnet housing spaces and wherein spaces for flux barrier are formed in the rotor, each of the spaces for flux barrier elongating from a corresponding edge section of a permanent magnet housing space in the width direction of a permanent magnet towards a rotor surface, and wherein a width and a housing position of each permanent magnet are determined so that a minimum value of a distance from a portion of a boundary face of the permanent magnet housing space in a rotor surface side, which boundary face corresponds to an edge section in a width direction of the permanent magnet, to a boundary face of the permanent magnet housing space and the space for flux barrier in a rotation axis side of the rotor, is greater than a distance of the permanent magnet housing space in its thickness direction at the edge section in the width direction of the permanent magnet.

3. A brushless DC motor as set forth in claim 2, wherein a formula of $1r \geq 1m(1+\cos\theta 2)/\sin\theta 2 - (1w^2-1m^2)^{1/2}$ is determined in correspondence to formulae of $1w < 1m/\sin(\theta 2/2)$ and $1r \leq 1r'$, and a formula of $1r \leq 1m(1+\cos\theta 2)/\sin\theta 2 + (1w^2-1m^2)^{1/2}$ is determined in correspondence to formulae of $1w < 1m/\sin(\theta 2/2)$ and $1r > 1r'$, when an angle between boundary faces in the rotation axis side of the permanent magnet housing space and the space for flux barrier is determined to be $\theta 2$, a length of the permanent magnet housing space in its thickness direction is determined to be 1m, a distance between a connection section of boundary faces of the permanent magnet housing space and the space for flux barrier in a rotor surface side and a connection section of boundary faces of the permanent magnet housing space and the space for flux barrier in the rotation axis side is determined to be 1w, a distance from a connection section of the boundary face of the permanent magnet housing space in a rotor surface side and corresponding boundary face of the space for flux barrier to an edge section of the permanent magnet in its width direction is determined to be 1r, and a distance from a connection section of the boundary face of the permanent magnet housing space in a rotation axis side and corresponding boundary face of the space for flux barrier to a corresponding edge section of the permanent magnet in its width direction is determined to be 1r'.

4. A brushless DC motor as set forth in one of claims 1 through 3, further comprising projection sections for preventing movement of a permanent magnet in its width direction, which projection sections are formed at a boundary face of a permanent magnet housing space (3*b*).

5. A brushless DC motor comprising a stator and a rotor, wherein permanent magnet housing spaces are formed at predetermined positions which spaces are parallel to a rotation shaft of the rotor, and permanent magnets each having a predetermined thickness and width are housed in corresponding permanent magnet housing spaces, and wherein spaces for flux barrier are formed in the rotor, each of the spaces for flux barrier elongating from a corresponding edge section of a permanent magnet housing space in the width direction of a permanent magnet towards a rotor surface, and wherein a permanent magnet housing space and a space for flux barrier are formed so that a minimum value of a distance from a portion of a boundary face of the permanent magnet housing space, in a rotor surface side which portion corresponds to an edge section of the permanent magnet in its width direction, to boundary faces of both spaces in a rotation axis side of the rotor, is greater than a distance of the permanent magnet housing space in its thickness direction at the edge section of the permanent magnet, and a formula of $1m \geq 1m'$ is determined when the distance of the permanent magnet housing space in its thickness direction is determined to be 1m, and a distance of the space for flux barrier in a circumferential direction is determined to be 1m'.

* * * * *